United States Patent Office 3,390,100
Patented June 25, 1968

3,390,100
PROCESS FOR THE PREPARATION OF
EXTRUDATES FROM HYDROGELS
Nicholas Chomitz, Yonkers, N.Y., and William Eugene
Sanborn, Wilton, Conn., assignors to American Cyanamid Company, Stamford, Conn., a corporation of Maine
No Drawing. Filed Feb. 14, 1964, Ser. No. 344,842
7 Claims. (Cl. 252—455)

ABSTRACT OF THE DISCLOSURE

This invention relates to the preparation of extrudates from inorganic hydrogels, which extrudates find use as catalysts and catalyst supports. More particularly, it relates to a method which comprises homogenizing an aqueous slurry of an inorganic hydrogen having a solids content of 4 to 25% to produce an homogenizate of substantially the same liquids to solids ratio as the slurry and thereafter extruding the homogenizate to produce an extrudate which can be worked up by conventional techniques to give a material which is suitable for use in the field of catalysis.

---

This invention relates to a process for the preparation of extrudates from hydrogels and more particularly relates to a process for the continuous preparation of extrudates from hydrogels, which extrudates when dried and calcined are suitable for use as catalyst materials, i.e., if they already contain promoters, or as substrates of the type which, when impregnated with promoters, produce catalyst materials.

The preparation of extrudates from hydrogels ahs not heretofore been feasible on a mass-production basis. This has been so because a hydrogel of sufficiently fluid consistency to be handled by pumps is not at the same time of sufficiently solid consistency to hold its shape on extrusion. This is the dilemma faced after hydrogel precipitation or repulping of hydrogel filter cake.

In small scale operation there is no problem. Since the handling on this scale is by spoon, spatula, or scoop rather than by pump, the hydrogel can be handled at a sufficiently solid consistency for extrusion. In production operations the dilemma is solved by the use of special equipment and additional process steps such as are described below.

Thus, the preparation of extrudates heretofore from hydrogels has typically involved procedures, usually batch type, in which the hydrogel is pumped to special evaporating machinery and partially dried or concentrated to a sufficiently solid consistency to be extrudable. Such procedures require the employment of costly processing steps and equipment between the formation of the hydrogel and its actual extrusion which render them unattractive for use in large scale production.

Other related processes for extruding hydrogel type materials have entailed the partial drying, or drying and blending, of the hydrogel extrusion feed to a critical solids content, and thereafter extruding the material. Such processes like those described above have the disadvantage of requiring the additional drying and/or blending step to place the material to be extruded at said critical solids content, one which is capable of being handled by conventional extrusion devices.

It will thus be seen that such procedures fail to provide a process for large scale production whereby a slurry of hydrogel which is readily transportable as by pumping may be extruded without the expense and delay of steps which modify the solids contents to a critical level as by drying and/or blending steps.

Accordingly, it is an object of this invention to provide a process for the preparation of extrudates of the type suitable for use as catalyst or in their preparation from hydrogels of inorganic oxides in which the hydrogel is employed in an easily handleable physical form, i.e., pumpable, which does not require that the hydrogel be dried or blended to a critical solids content prior to extrusion, and thus avoids the necessity of the inclusion of such undesirable and costly step(s) required to achieve such a solids content.

It is a further object of this invention to provide a process, readily adaptable to large scale production, for the preparation of extrudates from hydrogels or hydrous inorganic oxides in which the hydrogel while in a pumpable state, i.e., about 4 to 25% solids, is, without a substantial change in liquid to solids ratio, converted to a form capable of being readily extruded to form firm hydrogel extrudates.

These and other objects and advantages of the present invention will become more apparent from the detailed description thereof set forth hereinbelow.

According to the present invention, a process for the production of extrudates from inorganic oxide hydrogels is provided which comprises subjecting a pumpable feed slurry containing said hydrogels having a continuous water phase and a solids content of from about 4 to about 25% to a shearing action sufficient to eliminate the fluidizing effect of the continuous water phase and to produce a material of substantially the same liquid to solids ratio which, when extruded as through an orifice of about $\frac{1}{16}''$ to about $\frac{1}{2}''$ diameter, will not deform substantially under its own weight, and thereafter extruding the hydrogel subjected to said shearing action.

The inorganic oxide hydrogel, which may contain various promoters, i.e., catalytic metals or oxide precursors, constituting the feed slurry may be composed of silica, alumina, magnesia, vanadia, zirconia and the like or combinations of these and other inorganic oxides. Thus, silica-alumina, silica-alumina-magnesia, silica-magnesia and various other combinations of inorganic oxide hydrogels are contemplated. Preferably, this invention is concerned with silica, alumina and silica-alumina hydrogels wherein the alumina content is from about 5 to about 40% and preferably from 10 to about 30% based on the dry weight of the silica-alumina.

The term "hydrogel" as that term is employed herein refers to gels, precipitated gels, hydrous oxide precipitates, or combinations thereof, in an undried state, and usually washed free of salts resulting from gelation or precipitation reactions. Water is a major component of these materials comprising 80 to about 95% of its weight. The water is held in a semi-rigid particulate form within the pores or interstices of the hydrogel particles. Thus, hydrogels, the material employed in the present invention, distinguish from sols and dried gels, the term "sol" referring to colloidal dispersions which are macroscopically homogeneous and opalescent in appearance and are characterized by the flow properties of a true liquid, and the dried gel refers to the product obtained by drying hydrogels whereby the structure of the oxide gel is set for the most part irreversibly. While dried gels may contain a residum of combined water, i.e. as much as 50% by weight, they are considered to be essentially dry and to be a rigid solid.

By the term "feed slurry" as it is employed herein it is meant a composition of matter which is characterizable as a suspension of particles in a liquid medium, i.e., a mixture having both combined water and free water in a continuous water phase, and generally characterizable by non-Newtonian properties.

The inorganic oxide hydrogels are capable of preparation employing a wide variety of techniques well known, particularly to the catalyst industry.

Thus, silica hydrogels or hydrated silica gel may be prepared by precipitating silica from an alkali metal silicate with a material such as sulfuric acid under conditions of pH, temperature, agitation and the like known to those skilled in the art.

Where inorganic oxide cohydrogels are contemplated such as silica-alumina cogels, such materials may be prepared in accordance with U.S. Patent Nos. 2,467,314, 2,478,519 and 2,701,793, among others, and in the event that inorganic additive materials, as for example various clays such as kaolin, are to be incorporated therewith, procedures such as are described in U.S. Patent No. 3,023,172 may illustratively be employed. Typically, silica-magnesia cogels may be prepared according to U.S.P. 2,582,099 or Canadian Patent 610,679.

Alumina hydrogels may be prepared by precipitation from a water solution of a water-soluble aluminum compound which may be either an aluminum salt such as aluminum sulfate, aluminum nitrate, aluminum chloride and the like or an alkali metal aluminate such as sodium or potassium aluminate or both. Thus, alumina hydrogels may be prepared in accordance with U.S.P. 2,657,115 and as specifically modified by the procedure set forth in U.S.P. 3,032,514 and U.S.P. 3,086,845, among others.

As noted, the hydrogel containing feed slurry must have a continuous water phase and will generally contain from about 4 to about 25% solids and specifically from about 6 to about 15% solids on a dry basis for silica-alumina cogel, with the preferred solids content for such cogels being from about 6 to about 10% solids. Normally, the feed slurry will contain a hydrogel content, i.e., gel including imbibed water, of about 50% and more by weight of the total feed slurry.

As will be apparent to those skilled in the art, whether or not a feed slurry is pumpable depends to a substantial extent on the inorganic oxide hydrogel or cogel composition. Thus alumina hydrogel is pumpable at solids contents as high as 20% and more, while silica hydrogel is not readily pumpable when solids contents exceed about 10% solids. Combinations of these hydrogels with each other or other hydrogel materials will normally have intermediate optimum pumpable solids contents. Thus, silica-alumina hydrogels are pumpable at from 4 to about 10% solids and silica-magnesia hydrogels are best pumpable at solids contents of from about 7 to 15%. Normally the presence of promoters in the hydrogel feed slurry will not modify substantially the upper pumpable solids limits of the hydrogel base material.

The shearing action to which the hydrogel feed slurry is subjected is that which is sufficient to eliminate the fluidizing effect of the continuous water phase. This shearing action converts the pumpable flowable hydrogel feed slurry to a semi-rigid material without substantially changing the water to solids ratio of the slurry, apparently as a result of the redistribution of its free water content, which water is thought to be primarily responsible for its fluidity. It is thought that the shearing of individual gel particles creates a greater external surface area which by surface tension forces as well as capillary attraction forces manages to fix the water within a network of the gel-water system. As noted, the shearing action produces substantially no change in composition between total water and total solids. The shearing action is believed to modify the network of the gel and its change in rigidity as a result of the redistribution of water.

The shearing or comminution of the hydrogel particles in the feed slurry may be conveniently accomplished by passing the feed slurry through a homogenizer, as for example an ordinary spring-pressed or spring-loaded homogenizing valve. In fact, in the present specification the extent of shearing or comminution will be, insofar as it is defined numerically, defined as that degree corresponding to the homogenization obtained by passing the hydrogel feed slurry through such a valve at a defined pressure drop.

In addition, the sufficiency of the shearing action may be determined by a penetration test in which the degree of penetration achieved under test conditions can be correlated to the degree of shear required in order to produce a thickened or stiffened hydrogel sufficient to provide good extrudates.

An accurate and general method of determining whether or not the hydrogel feed slurry has been rendered sufficiently rigid by the shearing action is to determine whether or not extrudates formed from material so processed when in the form of fresh extrudate of from about 1/16" to about 1/2" diameter will be free from substantial deformation under its own weight prior to drying and calcination. Thus, extrudates formed from such materials when placed on their sides do not tend to flow, become flattened, or lose their circular cross section. In accordance with this invention, it has been determined that this degree of shear will normally be produced by a pressure drop of at least 500 pounds per square inch and preferably at least 1500 pounds per square inch on an ordinary spring-loaded homogenizer, as for example a Mantin-Gaulin 1500 gallons per hour (g.p.h.) 4000 p.s.i. MC-Series homogenizer.

After the subjection of the hydrogel feed slurry to the shearing action, the stiffened hydrogel may be then readily extruded as through an orifice of from 1/16" to 1/2" diameter.

In this connection, it should be noted that one of the advantages of the present process resides in the fact that it is easily adaptable to continuous extrusion rather than to batch type extrusion. Thus, the hydrogel feed slurry is subjected to shearing action or homogenization and from homogenization is in suitable physical form for continuous extrusion.

After extrusion, the extrudates are dried and calcined.

Care should be exercised in drying, since proper drying of what will hereinafter be termed hydrogel extrudates depends to a substantial extent upon having a sufficiently slow drying rate to prevent the break-up of the extrudates and less upon the actual temperature at which the drying is carried out. It is thus thought that where the extrudates initially may be characterized by a solids content of from 4 to about 25% depending upon the hydrogel composition, and preferably from about 6 to about 20% that an initial drying stage or step should be conducted in such a manner as to approximately double the initial solids content, i.e., where the initial solids content is from 6 to 10% the solids content after the initial drying of the solids should be from about 12 to about 20%. The important thing about the drying aspects of the present process is that care must be exercised so as to prevent the break-up of the extrudates and one method of achieving this end is accomplished by stage drying techniques in which the water content of the extrudates is gradually reduced. Normally in drying operations temperatures of 150 to 350° F. are employed.

Subsequent to drying, the extrudates, which will contain from 50% to about 15% of water, are calcined, typically at temperatures up to about 1100–1200° F. where they are maintained for periods of time of up to an hour and the inorganic metal oxides are activated.

It should be noted that in general undesirable ions, such as alkali metal ions, sulfate ions, should be absent or reduced to acceptable minimums in the calcined extrudate substrates or catalyst. This can be accomplished by washing the hydrogel filter cake or by drying and calcining the hydrogel extrudates prior to washing. Thus the hydrogel may be washed prior to drying and calcination or subsequent thereto.

In the event that the extrudates are to be employed as catalysts, it will be appreciated that either the hydrogel feed slurry may have promoters incorporated therein or the calcined extrudates may be impregnated in general terms in accordance with procedures well known to those skilled in the art. As has been noted above, it has been our experience that when the promoters are incorporated into the hydrogel feed slurry that their presence does not significantly affect the subsequent processing steps in the preparation of the extrudates of this invention.

Where the extrudates are to be employed as catalysts, they may, depending upon the composition, be employed as cracking catalysts for fixed or moving beds, particularly where the extrudates contain silica-alumina, silica-magnesia and other compositions known to be useful as cracking catalysts. In addition, the hydrogel extrudates may contain certain metals or metal oxides as promoters to form finished particulate catalyst useful for effecting reactions such as isomerization, hydrogenation, reforming, hydrocracking, hydrodesulfurization of petroleum hydrocarbons and the like. Metals and metal oxides which may be used alone or in combination with one or more other metals or their oxides of the type set forth below for particular catalytic purposes are Group IB metals including copper, silver and the like, Group VB metals such as vanadium for use in oxidation catalysts, Group VIII metals such as platinum, palladium, rhodium, nickel, cobalt and the like, transition metal oxides of Group VI such as chromium, molybdenum, tungsten and in the case of hydrocracking and reforming, promoters such as the halogens and in particular chlorine and fluorine.

As is well known, promoters of the general type described above are present in the final catalyst composition in amounts to render them suitable for a particular end use. In general, a promoter or combination of promoters may constitute amounts of from between .01 and 20% by weight of the final catalyst composition.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

In the following examples reference is made to physical properties such as pore volume, surface area and the like. In general, these are determined in accordance with Cyanamid's Test Method for Synthetic Fluid Cracking Catalyst of January 1957. Compact Bulk Density (CBD) is determined by slowly pouring 100 grams of calcined extrudates into a graduated cylinder placed on a vibrator and the volume determined. The CBD is equal to the weight of the material divided by the volume. Crush strength is determined by placing an extrudate on its side between two parallel plates. Force is applied to the top plate by means of pneumatic pressure until the extrudate is crushed. The device is such that the air pressure in pounds to cause crushing is the crush strength of the extrudate.

Example 1

3,140 parts of silicate of soda (28½% $SiO_2$, 8.9% $Na_2O$), 1800 parts of 25% sulfuric acid and 18,000 parts of water are introduced simultaneously into a suitable strike tank so as to precipitate a silica gel at a pH of 9.95.

The silica gel is coated by the addition to the strike tank of 870 parts of aluminum sulfate solution containing 8% of $Al_2O_3$ and 577 parts of a 26% $Al_2O_3$ solution of sodium aluminate.

This procedure is sufficient to add 20% of alumina to the silica gel based on the final weight of the catalyst composition.

The coated slurry is washed at a pH of 4.5 to 5 on a rotary vacuum filter employing two filtration stages, the rate of filtration being controlled in order to permit the reduction of soda content at below .03%.

The second stage filter cake is repulped to a solids content of about 3½ to 4% and adjusted to a pH 7.5 with ammonia and subsequently filtered.

The filter cake is again repulped and filtered and a third stage filter cake, which is repulped with water and with a solution containing 191 parts of nickel nitrate hexahydrate, so as to produce a thick feed slurry containing about 7.5% of solids.

The resulting slurry is pumped to a homogenizer (Mantin-Gaulin 1500 g.p.h.) and subjected to the shearing force produced by a pressure drop of 3500 p.s.i. The feed slurry is thus thickened to a stiff paste and residual pressure is used to force the stiff paste continuously through a multiport extrusion header in a manner so as to achieve uniformity of flow through individual 5/32" ports.

The resulting cylindrical strands then form a loose bed on a perforated belt of a continuous through-circulation belt drier.

The strands containing 7.5% solids are raised to 15.8% solids during an initial drying stage at an inlet air temperature of 300° F. Through a second and third stage drying, the solids content is raised to 57% at temperatures ranging from 150 to 300° F. and thereafter the impregnated extrudates are calcined at temperatures of up to 1100° F.

The material prepared in accordance with the above procedure, which is highly suited for use in preparing hydrocracking catalyst, is characterized by the following properties:

| | |
|---|---|
| Pore volume cc./g | .35 |
| Surface area m.²/g | 386 |
| Compact bulk density g./cc | .81 |
| Crush strength in lbs. | 16.7 |
| Average length in inches | .166 |
| Diameter in inches | .066 |

The final catalyst contained 4% nickel oxide, 20% alumina and the balance silica.

Example 2

A series of experiments were carried out on silica-alumina hydrogel feed slurries of varying solids content to illustrate the stiffening of feed slurries subjected to shear as imparted by homogenization. These experiments quantitatively relates the degree of shear or homogenization as measured by pressure drop with the observed thickening or stiffening of the hydrogel slurry. This is done by relating the gel content and the degree of homogenization to stiffening and the resistance to penetration (a penetrometer test).

The silica-alumina hydrogels contained 25% of alumina based on the dry weight of silica-alumina and the hydrogel had the following physical properties, based on a spray dried product such as is produced in accordance with U.S.P. 2,644,516:

| | |
|---|---|
| Pore volume cc./g | .9 |
| Surface area m.²/g | 525 |
| Apparent bulk density cc./g | 38 |
| Pore diameter A | 70 |

The determination of gel content is essentially a filtration test whereby the vacuum drainable water or free water can be separated from the slurry with a satisfactory degree of reproducibility. In this determination a thin rubber sheet covers the top of a Buchner funnel and is sealed to the top employing rubber bands and allowing the filtration at 30 inches of vacuum to proceed until the thin sheet is drawn flat against the cake. The drainable water collected is what is referred to as the free water and the filter cake as the gel. The gel content is then:

$$\frac{\text{weight of filter cake}}{\text{weight of filter cake} + \text{weight of water}} \times 100 = \text{gel percent}$$

The penetration test involves the insertion of a 25 ml. tapered centrifuge tube into the slurry, and relating the grams of weight added as lead shot into the tube per inch of penetration is the basis of this test. In practice, the slurry to be tested is placed in a 500 ml. beaker and the centrifuge tube is placed, taper down, on the top surface of the slurry and allowed to seek its level. The tube is freely supported in an erect position by a ring holder. Lead shot is then added into the tube until the entire tube settles into the slurry to a predetermined level. The combined weight of the tube and the shot divided by the distance penetrated then denotes the rigidity of the slurry in grams per inch. In the test the predetermined level of penetration was fixed by the level of rest of the empty tube in an unhomogenized slurry at a prescribed solids content. All homogenized slurries were tested to that level by the addition of lead shot.

Homogenization in this example was carried out in a 120 gallon per hour 3000 p.s.i. Scott-Williams Hydropulse pump.

Table I reports the data from these tests.

TABLE I

[Variation of hydrogel slurry feed solids and the observed response as changes in gel-content, in pressure drop per foot of ½" pipe and resistance to penetration]

| | Homogenization Pressure | | | | |
|---|---|---|---|---|---|
| | 0 | 500 | 1,500 | 2,500 | 3,000 |
| (1) Slurry Solids 4.2%: | | | | | |
| Gel Content, percent | 40 | | 45 | 47 | 48 |
| Pressure Drop, p.s.i./ft | 0 | | 0 | 0 | 0 |
| Penetration, gms./in | 9.45 | | 12.95 | 15.07 | 16.78 |
| Flow Rate, lbs./min | 3.0 | 2.75 | 1.94 | 1.87 | 1.87 |
| (2) Slurry Solids 5.3%: | | | | | |
| Gel Content, percent | 46 | 49 | 51 | 52 | 53 |
| Pressure Drop, p.s.i./ft | 0 | 0 | 0 | .5 | .9 |
| Penetration, gms./in | 9.91 | 13.38 | 20.83 | 29.26 | 34.41 |
| Flow Rate, lbs./min | 2.93 | 2.75 | 2.81 | 2.87 | 2.75 |
| (3) Slurry Solids 5.6% | | | | | |
| Gel Content, percent | 47 | 49 | 53 | 57 | 59 |
| Pressure Drop, p.s.i./ft | 0 | 0 | 0 | .8 | 1.1 |
| Penetration, gms./in | 9.45 | 13.80 | 20.62 | 35.99 | 36.32 |
| Flow Rate, lbs./min | 3.50 | 3.56 | 3.31 | 2.75 | 2.37 |
| (4) Slurry Solids 6.2% | | | | | |
| Gel Content, percent | 57 | 58 | 65 | 65 | /*72 |
| Pressure Drop, p.s.i./ft | 0 | 0 | 0 | 1.4/ | 1.6 |
| Penetration, gms./in | 10.99 | 19.59 | 40.48 | 71.24 | 78.03 |
| Flow Rate, lbs./min | 2.93 | 2.81 | 3.56 | 2.62 | 2.62 |
| (5) Slurry Solids 7.0% | | | | | |
| Gel Content, percent | 60 | 65 | 73/* | 76 | 74 |
| Pressure Drop, p.s.i./ft | 0 | .4 | /1.3 | 2.0 | 2.2 |
| Penetration, gms./in | 11.95 | 21.36 | 63.71 | 72.05 | 80.52 |
| Flow Rate, lbs./min | 3.56 | 3.87 | 3.0 | 2.75 | 2.50 |
| (6) Slurry Solids 9.8% | | | | | |
| Gel Content, percent | 70 | 84/* | 98 | 98 | 93 |
| Pressure Drop, p.s.i./ft | 1.1 | /7.2 | 7.7 | 12.8 | 16.0 |
| Penetration, gms./in | 21.40 | 226.96 | 401.2 | 431.06 | 498.77 |
| Flow Rate, lbs./min | | 3.25 | 3.25 | 2.50 | 1.87 |
| (7) Slurry Solids 10.4% | | | | | |
| Gel Content, percent | 85 | /*93 | 93 | 100 | 104 |
| Pressure Drop, p.s.i./ft | 2.7/ | 5.9 | 15.5 | 18.0 | 20.0+ |
| Penetration, gms./in | 45.20 | 378.29 | 676.16 | 692.35 | 747.33 |
| Flow Rate, lbs./min | 3.65 | 3.12 | 2.75 | 1.75 | 1.0 |

* Fresh (undried) hydrogel extrudates to the right of the marker were of sufficient strength to maintain their circular cross section.

In all experiments the character of the slurry after homogenization is seen to be increasing in rigidity as the degree of homogenization is increased.

Table I above demonstrates the changing character of the hydrogel when subjected to the homogenization shearing treatment. It will be noted that three distinct tests are used to describe the sheared hydrogel. The results demonstrate that for the given solids level for the particular silica-alumina hydrogel that (1) homogenization is required to produce a material which may be extruded in accordance with this invention; (2) the minimum amount of homogenization varies with the solids content of the feed slurry; and (3) the higher the solids content of the feed slurry, the least amount of shearing is required to produce a stiffened hydrogel material from which acceptable hydrogel extrudates can be formed.

Example 3

Silica-alumina hydrogel prepared in accordance with Example 1 above is repulped and combined with a solution containing 291 parts of cobalt nitrate hexahydrate and 374 parts of ammonium molybdate to provide, when dried and calcined, 2.7% cobalt oxide, 13% molybdenum oxide on a 21.1% alumina and 63.2% silica catalyst base.

The above catalyst had a surface area (SA) of 293 m.$^2$/g., a pore volume (PV) of .47 cc./g., a Compact Bulk Density (CBD) of .7 g./cc., a crush strength (CS) of 54 pounds, a crush strength per unit of length (CSL) of 294, a diameter (Dia.) of .074 inch and a length (L) of .184 inch.

Example 4

Silica-alumina hydrogels are prepared in accordance with Example 1, but made to contain 13% and 25% alumina. The calcined extrudates so produced have crush strengths of 20 pounds.

The 13% alumina, silica-alumina extrudates when dried and calcined have an SA of 500 m.$^2$/g., a PV of .52 cc./g., a CBD of .65 g./cc., CS of 31 pounds, CSL of 152 pounds, L .20 inch, Dia. .079 inch.

The 25% alumina, silica-alumina extrudates have the following measurements: SA of 410 m.$^2$/g., PV .71 cc./g., CBD .562 g./cc., CS 19.3 pounds, CSL 83 pounds, L .234 inch, Dia. .088 inch.

Example 5

Silica gel is prepared in accordance with Example 1. Thus 3,140 parts of silicate of soda (28½% SiO$_2$ and 8.9% Na$_2$O), 1800 parts of 25% sulfuric acid and 18,000 parts of water are introduced simultaneously into a suitable strike tank so as to precipitate silica gel at pH of 9–9.5.

The silica gel is then washed free of salts at pH of 4–4.5 on a rotary vacuum filter employing filtration stages to permit the reduction of soda content to below 0.03%. The second stage filter cake is repulped to a solids content of 3½ to 4% and adjusted to pH of 6.8–7.5 in order to permit reduction of sulfate to below 1.0%.

The filter cake is again repulped in a heated mixing kettle to which 430 parts of magnesium oxide containing 93% MgO are added. The magnesia is allowed to react with the silica gel for 3 hours at 70° C. At the completion of the reaction the silica-magnesia catalyst hydrogel is filtered and repulped to a slurry having a solids content of 15%.

The resulting slurry is then homogenized and extruded as in Example 1.

The silica-magnesia extrudates contain 25% magnesia, 75% silica, and are characterized by a SA of 555 m.$^2$/g., a CBD of .84 g./cc., a PV of .40 cc./g., a CS of 27 pounds, a CSL of 146, a Dia. of .138 inch, an L of .181 inch.

Example 6

Silica gel prepared in accordance with Example 5 after washing and filtration is repulped again in a mixing vessel. To the silica gel thus repulped is added an ammoniacal solution of copper nitrate containing 396 parts of copper nitrate. The mixture is reacted for 1 hour and then filtered and washed free of unreacted copper nitrate. The final filter cake is repulped to 9% solids content.

The resulting slurry is homogenized and extruded, the hydrogel extrudates dried and calcined to produce a final product containing 90% silica and 10% copper.

This catalyst had a SA of 500 m.$^2$/g., a CBD of .66 g./cc., a PV of .7 cc./g., a CS of 40 pounds, a CSL of 260 pounds, a Dia. of .075 inch, an L of .155 inch.

Example 7

3480 parts of aluminum sulfate solution containing 8% Al$_2$O$_3$, 2310 parts of a 26% Al$_2$O$_3$ solution of sodium aluminate and 12,500 parts of water are introduced simultaneously into a suitable agitated strike tank so as to precipitate alumina hydrogel at a pH of 7–7.5. The pH is then adjusted to 10.5 by the addition of sodium aluminate and the alumina hydrogel is filtered and washed at pH 10.5 to reduce the soda and sulfate content to below .5%.

The filter cake is repulped and filtered at pH 7–8 to reduce the soda content to below .02%.

The filter cake thus prepared is repulped to 15% solids and then pumped to the homogenizer, extruded and the extrudates dried and calcined.

The alumina extrudates thus prepared are a catalyst base material onto which catalytic agents or promoters may be impregnated to form, for example, cobalt-molybdenum oxide hydrodesulfurization catalysts.

The alumina extrudates were characterized by a SA of 250 m.$^2$/g., a PV of .45 cc./g., a CBD of .72 g./cc., a CS of 55 pounds, a CSL of 29 pounds, a Dia. of .079 inch, an L of .184 inch.

Example 8

Alumina hydrogel filter cake containing 1200 parts of Al$_2$O$_3$ and prepared in accordance with Example 7 is reslurried and mixed with 164 parts of cobalt nitrate hexahydrate and 185 parts of ammonium molybdate. The slurry and promoters having a solids content of 18% are mixed for 1 hour and then extruded in accordance with Example 1.

The resulting extrudates are dried and calcined and contain 3% CoO and 11% MoO$_3$, the remainder being alumina.

It is not meant by the foregoing examples that combinations of promoters are limited to those promoters set forth in general or specifically illustrated. Additional promoters such as vanadia, zirconia, calcia, strontia, baria, may also be incorporated in catalyst compositions for specific end uses.

We claim:

1. A process for the production of extrudates directly from undried inorganic hydrogels, which comprises subjecting a pumpable feed slurry of said undried inorganic hydrogel having a continuous water phase and a solids content of from about 4 to about 25% to a shearing action sufficient to eliminate the fluidizing effect of the continuous water phase and to produce a material of substantially the same liquid to solids ratio which when extruded will not deform under its own weight, and thereafter extruding the hydrogel subjected to said shearing action.

2. A process for the production of extrudates directly from undried alumina hydrogel, which comprises subjecting a pumpable feed slurry of said undried alumina hydrogel having a continuous water phase and a solids content of from about 4 to about 25% to a shearing action sufficient to eliminate the fluidizing effect of the continuous water phase and to produce a material of substantially the same liquid to solids ratio which when extruded through orifices of from about $\frac{1}{16}''$ to about $\frac{1}{2}''$ in diameter will not deform under its own weight, and thereafter extruding the hydrogel subjected to said shearing action.

3. A process for the production of extrudates directly from undried silica-alumina hydrogel containing from 5 to 35% of alumina based on the dry weight of the hydrogel, which comprises subjecting a pumpable feed slurry of said undried silica-alumina hydrogel having a continuous water phase and a solids content of from about 6 to about 10% to a shearing action sufficient to eliminate the fluidizing effect of the continuous water phase and to produce a material of substantially the same liquid to solids ratio which when extruded through orifices of from about $\frac{1}{16}''$ to about $\frac{1}{2}''$ in diameter will not deform under its own weight, and thereafter extruding the hydrogel subjected to said shearing action.

4. A process for the production of catalyst in the extrudate form directly from undried promoter impregnated inorganic oxide hydrogel which comprises subjecting a pumpable feed slurry of said undried promoter impregnated inorganic oxide hydrogel having a continuous water phase and a solids content of from about 6 to about 20% to a shearing action sufficient to eliminate the fluidizing effect of the continuous water phase and to produce a material of substantially the same liquid to solids ratio which when extruded through orifices of from about $\frac{1}{16}''$ to about $\frac{1}{2}''$ in diameter will not deform under its own weight, and thereafter extruding the hydrogel subjected to said high shearing action.

5. A process for the production of catalyst in the extrudate form directly from undried promoter impregnated inorganic oxide hydrogel, which comprises subjecting a feed slurry comprising an undried promoter impregnated silica-alumina hydrogel having a continuous water phase and at a solids content of from about 6 to about 10% of said impregnated hydrogel to a shearing action sufficient to eliminate the fluidizing effect of the continuous water phase and to produce a catalyst material of substantially the same liquid to solids ratio which when extruded through an orifice of from about $\frac{1}{16}''$ to about $\frac{1}{2}''$ in diameter will not deform under its own weight, and thereafter extruding the hydrogel catalyst material subjected to said shearing action.

6. A process according to claim 5 in which the promoter includes a Group VIII metal.

7. A process for the production of extrudates directly from undried silica-magnesia hydrogel containing from 20 to 30% of magnesia based on the dry weight of the hydrogel, which comprises subjecting a pumpable feed slurry of said undried silica-magnesia hydrogel having a continuous water phase and a solids content of from about 7 to about 15% to a shearing action sufficient to eliminate the fluidizing effect of the continuous water phase and to produce a material of substantially the same liquid to solids ratio which when extruded through orifices of from about $\frac{1}{16}''$ to about $\frac{1}{2}''$ in diameter will not deform under its own weight, and thereafter extruding the hydrogel subjected to said shearing action.

References Cited

UNITED STATES PATENTS

| | | | |
|---|---|---|---|
| 2,529,283 | 11/1950 | Corner et al. | 252—455 |
| 2,773,843 | 12/1956 | Kimberlin, et al. | 252—457 |
| 2,879,546 | 3/1959 | Hemphill | 252—449 |
| 2,921,033 | 1/1960 | Houdry | 252—449 |
| 2,950,169 | 8/1960 | Murray et al. | 252—463 |
| 3,004,029 | 10/1961 | Lucas et al. | 252—455 |
| 3,020,243 | 2/1962 | Reitneier | 252—455 |
| 3,032,514 | 5/1962 | Malley et al. | 252—463 |
| 3,265,793 | 8/1966 | Otremba | 264—176 X |

DANIEL E. WYMAN, *Primary Examiner.*

C. F. DEES, *Assistant Examiner.*